US006837815B2

(12) United States Patent
Meggiolan

(10) Patent No.: US 6,837,815 B2
(45) Date of Patent: Jan. 4, 2005

(54) BICYCLE DERAILLEUR FOR GEAR CHANGES

(75) Inventor: Mario Meggiolan, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 09/991,923

(22) Filed: Nov. 26, 2001

(65) Prior Publication Data

US 2002/0065158 A1 May 30, 2002

(30) Foreign Application Priority Data

Nov. 24, 2000 (IT) .................................... T02000A1098

(51) Int. Cl.[7] ........................................... F16H 63/04
(52) U.S. Cl. ...................................................... 474/82
(58) Field of Search .............................. 474/78, 79, 80, 474/81, 82; 411/352, 353, 512, 525, 526, 527

(56) References Cited

U.S. PATENT DOCUMENTS

| 1,547,162 A | * | 7/1925 | Bohlman ..................... 411/533 |
| 2,342,910 A | * | 2/1944 | Tinnerman .................. 285/200 |
| 3,673,608 A | * | 6/1972 | Voorman, Jr. ................ 346/18 |
| 4,061,048 A |   | 12/1977 | Huret et al. |
| 4,096,653 A | * | 6/1978 | Kaarlela et al. ............. 37/457 |
| 4,201,095 A | * | 5/1980 | Cirami ........................ 474/81 |
| 4,618,333 A | * | 10/1986 | Nagano ....................... 474/80 |
| 5,389,043 A | * | 2/1995 | Hsu ............................. 474/80 |
| 5,456,637 A | * | 10/1995 | Chang ......................... 474/78 |
| 5,620,290 A | * | 4/1997 | Homfeldt et al. ........... 411/533 |
| 5,667,515 A | * | 9/1997 | Chu ............................ 606/116 |
| 5,779,581 A | * | 7/1998 | Fujii ........................... 474/82 |
| 5,951,081 A | * | 9/1999 | Foster et al. ................ 295/36.1 |
| 5,975,821 A | * | 11/1999 | Kue ............................ 411/533 |
| 6,234,927 B1 | * | 5/2001 | Peng ........................... 474/82 |
| 6,290,621 B1 | * | 9/2001 | Ichida ......................... 474/80 |
| 6,341,538 B1 | * | 1/2002 | Takachi ...................... 74/502.6 |

FOREIGN PATENT DOCUMENTS

| GB | 2 145 173 A | 3/1985 |
| TW | 335102 | 8/1997 |

* cited by examiner

Primary Examiner—David A. Bucci
Assistant Examiner—Vicky A. Johnson
(74) Attorney, Agent, or Firm—Volpe and Koenig, P.C.

(57) ABSTRACT

A rear derailleur for bicycle gear changes, comprising a top body or hanger bracket (12) and a bottom body or pulley-cage bracket (14) connected together by means of an articulated-parallelogram mechanism (16) which comprises a pair of links (26, 28) articulated to the hanger bracket (12) and to the pulley-cage bracket (14) by means of pins (30, 32) defining the axes of articulation of the articulated-parallelogram mechanism. Each of the aforesaid pins (30, 32) engages aligned holes (48, 50) of one of the brackets (12, 14) and one of the links (26, 28) and is constrained against sliding out in the direction of its own axis. The axial constraint of each pin (30, 32) is obtained by means of at least one washer (34) having snap-action engagement portions (40) which co-operate with an annular groove (36) of the pin (30, 32).

14 Claims, 2 Drawing Sheets

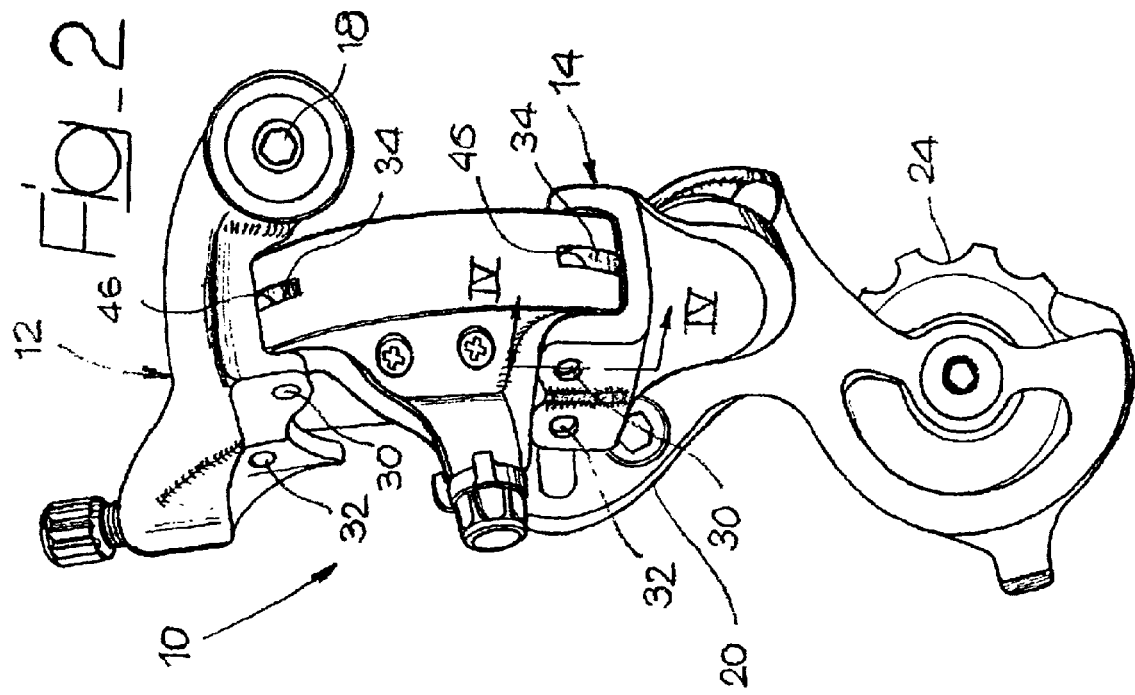
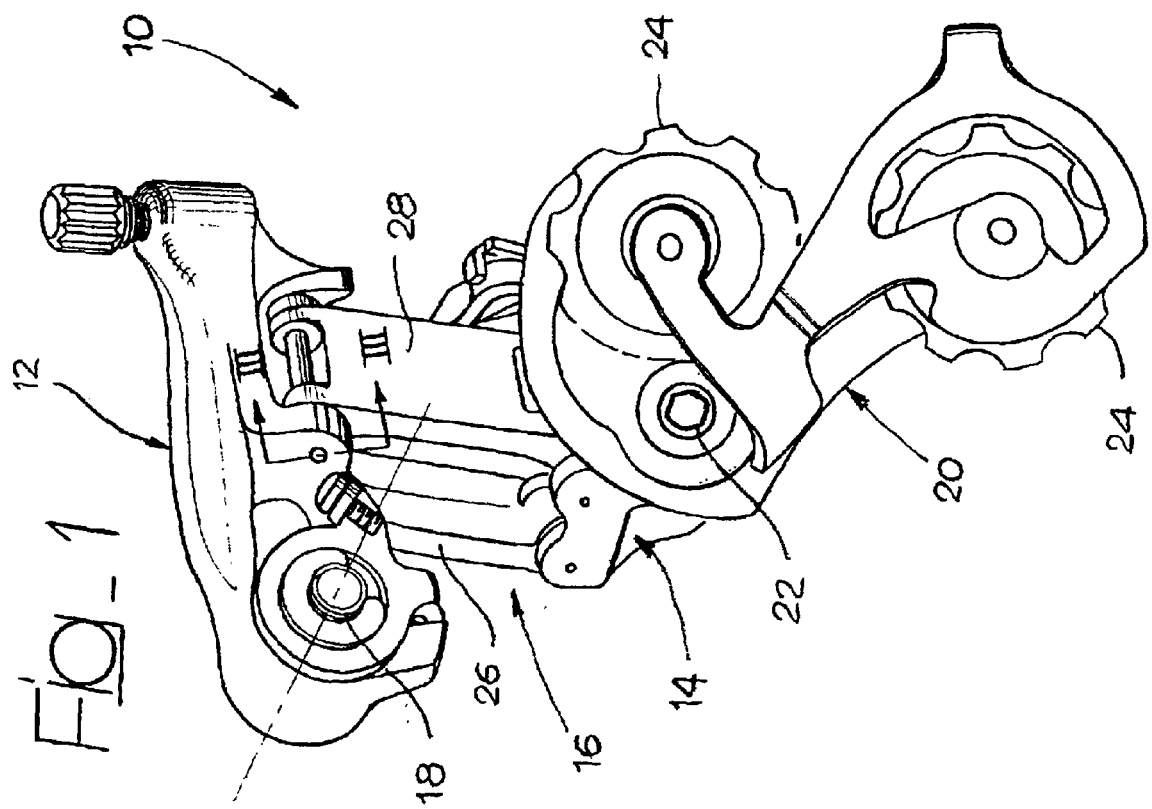

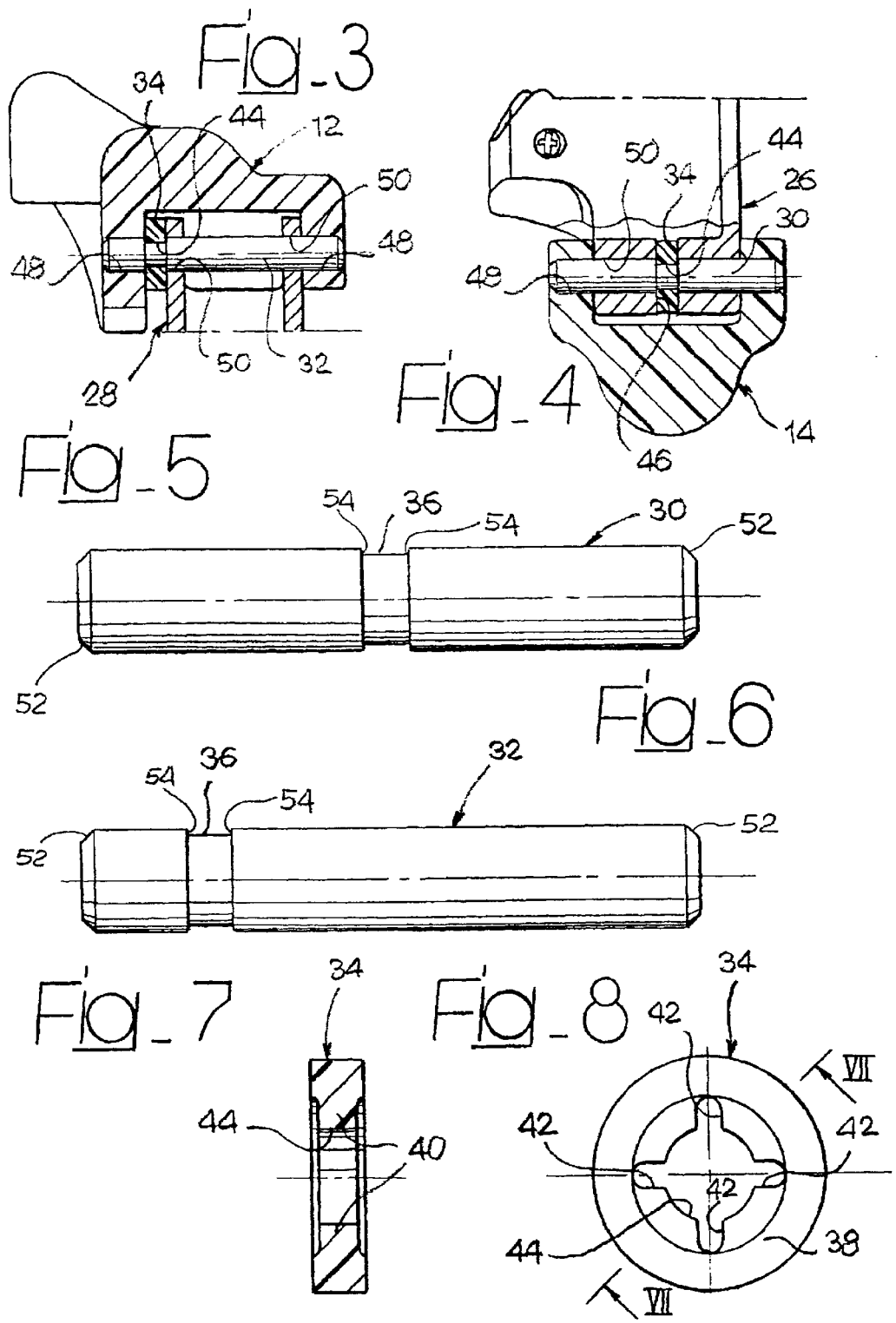

BICYCLE DERAILLEUR FOR GEAR CHANGES

BACKGROUND OF THE INVENTION

The present invention relates to a rear derailleur for bicycle gear changes.

Bicycle derailleurs comprise a top body which is designed to be fixed to the bicycle frame and which is referred to as "hanger bracket", and a bottom body, referred to as "pulley-cage bracket", which carries a rocker member that in turn carries two idler wheels that co-operate with the chain. The pulley-cage bracket is connected to the hanger bracket by means of an articulated-parallelogram mechanism comprising a first link and a second link. The said links are articulated to the hanger bracket and the pulley-cage bracket by means of pins which define the axes of articulation of the articulated-parallelogram mechanism.

In higher-quality derailleurs, the hanger bracket, pulley-cage bracket and the links of the articulated-parallelogram mechanism are made of light metal alloys, such as aluminium alloys or the like. Articulation of the links of the articulated-parallelogram mechanism to the hanger bracket and pulley-cage bracket is obtained by inserting axially the pins inside aligned holes of one of the brackets and one of the links. Each pin is constrained against sliding out in the direction of its own axis by means of plastic deformation of one or both of its ends against a surface of the hanger bracket or of the pulley-cage bracket, or else by means of a knurling of the pin which interferes with a corresponding wall of a hole made in one of the bodies. The deformation of the ends of the pins against the hanger bracket or the pulley-cage bracket, or else the drive fit of a knurled portion of the pin in a hole, does not create any problem in the case where the said bodies are made of metal material. It has, however, been found that the traditional method of axial constraint of the pins gives rise to problems of initiation of failure or cracking in the case where the hanger bracket or pulley-cage bracket is made of plastic material.

SUMMARY OF THE INVENTION

The purpose of the present invention is to overcome the aforesaid drawback by proposing a rear derailleur having the characteristics that form the subject of the main claim.

BRIEF DESCRIPTION OF THE DRAWINGS

The present invention will now be described in detail with reference to the attached drawings, provided purely by way of non-limiting example, in which:

FIG. 1 is a rear perspective view of a derailleur according to the present invention;

FIG. 2 is a front perspective view of the derailleur of FIG. 1;

FIGS. 3 and 4 are sectional views taken along the lines III—III and IV—IV of FIGS. 1 and 2, respectively;

FIGS. 5 and 6 are views at a larger scale of the pins used in the derailleur according to the present invention;

FIG. 7 is a sectional view, taken along the line VII—VII of FIG. 8, of a retaining washer according to the invention; and FIG. 8 is a front view of the washer of FIG. 7.

DETAILED DESCRIPTION OF THE INVENTION

With reference to FIGS. 1 and 2, number 10 designates a rear derailleur for a bicycle gear change. The derailleur 10 comprises, in a way of itself known, a top body or hanger bracket 12, a bottom body or pulley-cage bracket 14, and an articulated-parallelogram mechanism 16 which connects the pulley-cage bracket 14 to the hanger bracket 12.

The hanger bracket 12 is designed to be fixed to a bicycle frame (not illustrated) by means of a fixing screw 18.

The pulley-cage bracket 14 carries, in a known way, a rocker member 20 which is mounted in such a way that it can oscillate about a pin 22 and which carries a pair of idler wheels 24 designed to co-operate with the chain (not illustrated).

The articulated-parallelogram mechanism 16 comprises a front link 26 and a rear link 28. The links 26, 28 are articulated to the hanger bracket 12 and to the pulley-cage bracket 14 by means of respective pins 30, 32.

With reference to FIGS. 3 to 8, according to the present invention the pins 30, 32 are constrained against sliding out in the direction of their own axes without any deformation of their ends, this being particularly advantageous in the case where the said brackets are made of plastic material, in so far as the deformation of the ends of the pins could cause initiation of failure or cracking of the brackets. According to the invention, the axial constraint of each pin 30, 32 is obtained by means of a respective washer 34, preferably made of plastic material, shaped in such a way as to engage by snap action an annular groove 36 made in the pin 30, 32. The washer 34 has a continuous annular portion or rim 38 internally provided with snap-action engagement portions 40 which are elastically deformable. The portions 40 are formed by integral prolongations which project inwards from the inside of the annular rim 38 and are separated from one another by incisions 42 in order to increase deformability of the portions 40 in the axial direction. The deformable portions 40 define a through hole 44 which has a diameter smaller than the outer diameter of the cylindrical surfaces of the pins 30, 32. In the case of the pins 30 which provide the articulation of the front link 26 to the hanger bracket 12 and to the pulley-cage bracket 14, the circumferential groove 36 is provided in a central portion of the pin. The washer 34 is housed in a groove or notch 46 made in the top or bottom end portion of the front link 16. In the case of the pins 32 which provide the articulation of the rear link 28 to the hanger bracket 12 and to the pulley-cage bracket 14, the annular groove 36 is made in the vicinity of one end of the pin, and the washer 34 is housed between two surfaces facing one another of the link 28 and of the bracket 12 or 14 (FIG. 3).

Assembly of the derailleur 10 is carried out by positioning the washer 34 in such a way that its central hole 44 is aligned with the hole 48 of the hanger bracket 12 or pulley-cage bracket 14 and with the hole 50 of the front link 26 or rear link 28. The pin 30 or 32 is then inserted in the direction of its own axis into the aligned holes 48, 44 and 50. The pin must be driven in with a certain amount of force in order to produce elastic deformation of the deformable portions 40. To prevent any damage to the washer, each pin is provided with a lead-in chamfer 52 on one or both of its ends. The deformable portions 40 engage by snap action inside the annular groove 36 of the pin 30 or 32 as soon as the said groove arrives at the deformable portions 40. At this point, the assembly is completed in so far as the washer 34 is fixed integrally with the pin 30 in the axial direction and constitutes a radial shoulder that prevents any sliding-out of the pin 30 or 32 in the direction of the axis of the latter. The annular groove 36 of the pin 30 or 32 is shaped in such a way as to establish a shape fit with the corresponding part of the washer. Preferably, the groove 36 has angles 54 substantially of 90°, so that the force required for sliding the pins out is higher than the force required for driving them in.

The solution according to the invention is also advantageous from the aesthetic point of view in so far as the pins 30, 32 may be without any end portions protruding outside the bracket 12 or 14.

Of course, without prejudice to the principle of the invention, the details of construction and the embodiments may vary widely with respect to what is described and illustrated herein, without thereby departing from the scope of the present invention as defined in the ensuing claims.

What is claimed is:

1. A bicycle derailleur comprising:
   a hanger bracket;
   a first link, having first and second ends, pivotably attached to the hanger bracket, by the first end thereof, at a first pivot axis;
   a second link, having first and second ends, pivotably attached to the hanger bracket, by a first end thereof, at a second pivot axis;
   a pulley cage bracket, pivotably attached to the second end of the first link at a third pivot axis and pivotably attached to the second end of the second link at a fourth pivot axis; and
   at least one pin, having a given diameter and at least one annular groove, concentrically aligned with at least one of the pivot axes for selectively securing at least one of the first and second links; and
   at least one retaining member located within at least one of said links and comprised of an annular portion that defines an enclosed interior space having snap-action portions that define an opening that has a smaller diameter than the diameter of said at least one pin and removably retain said at least one pin in a selected position when the snap-action portions are within the annular groove of said at least one pin.

2. The derailleur of claim 1 wherein the member includes notches projecting from the annular portion to separate each of the snap-action portions.

3. The derailleur of claim 1 wherein the pin includes at least one end having a lead-in chamfer.

4. The derailleur of claim 1 wherein the annular groove of the pin cooperates with the member to form a snap fit.

5. The derailleur of claim 4 wherein the annular groove is a square groove.

6. The derailleur of claim 1 wherein the pin is aligned with the first axis, and the annular groove of the pin is positioned between the first link and the hanger bracket, and the member is connected to the annular groove to removably retain the pin and pivotably attach the first link to the hanger bracket.

7. The derailleur of claim 1 further comprising the hanger bracket having upper opposing portions extending through the first and second axes, the first link further having inner opposing portions creating a recess and extending through the first axis, the first end of the first link positioned between the upper opposing portions, wherein the pin is aligned with the first axis through the inner and upper portions, the annular groove of the pin is positioned between an interior surface of the upper opposing portions and an exterior surface of the inner opposing portions, and the member is connected to the annular groove to removably retain the pin and pivotably attach the first link to the hanger bracket.

8. The derailleur of claim 1 further comprising the hanger bracket having upper opposing portions extending through the first and second axes, the first link further having inner opposing portions creating a recess, extending through the first axis and positioned between the upper opposing portions, wherein the pin is aligned with the first axis through the inner and upper portions, the annular groove of the pin is aligned within the recess, and the member is connected to the annular groove to removably retain the pin and pivotably attach the first link to the hanger bracket.

9. The derailleur of claim 1 wherein the hanger bracket has a given width and the pin has a length that is no greater than equal to the given width.

10. The derailleur of claim 1 wherein the annular grove is continuous.

11. A bicycle rear derailleur comprising:
    a hanger bracket;
    a front link, having first end and second ends, pivotably attached to the hanger bracket at the first end of the front link at a first pivot axis;
    a rear link, having first and second ends, pivotably attached to the hanger bracket at a first end of the rear link at a second pivot axis;
    a pulley cage bracket, pivotably attached to the second end of the front link at a third pivot axis, and pivotably attached to the second end of the rear link at a fourth pivot axis; and
    at least one pin, having a given diameter, and having at least one annular groove, wherein the pin is concentrically aligned with at least one of the pivot axes for securing at least one of the front and rear links; and
    at least one retaining member located within at least one of the links comprised of a continuous annular portion that defines an enclosed interior space having snap-action portions that define an enclosed aperture that surrounds a longitudinal axis of the pin and removably retains said at least one pin in a selected position when the snap-action portions are within the annular groove of said at least one pin.

12. The derailleur of claim 11 wherein the snap-action portions are elastically deformable.

13. The derailleur of claim 11 wherein the snap-action portions are separated from one another in a circumferential direction.

14. The derailleur of claim 11 wherein the links define recesses for receiving the retainer member therein.

* * * * *